United States Patent [19]

Trowbridge, Jr.

[11] Patent Number: 4,964,161
[45] Date of Patent: Oct. 16, 1990

[54] COVER FOR A TELEPHONE HANDSET

[76] Inventor: Allen R. Trowbridge, Jr., 49 Main St., Kensington, Conn. 06037

[21] Appl. No.: 468,871

[22] Filed: Jan. 23, 1990

[51] Int. Cl.$^5$ ............................ H04N 1/17; H04R 1/12
[52] U.S. Cl. ..................................... 379/452; 379/438; 379/439
[58] Field of Search ............... 379/452, 431, 437, 439, 379/438

[56] References Cited

U.S. PATENT DOCUMENTS

| | | | |
|---|---|---|---|
| D. 214,322 | 6/1969 | Velasquez | 379/451 |
| D. 217,059 | 3/1970 | Todeschini | 379/451 |
| D. 224,023 | 6/1972 | Cliburn | 379/451 |
| D. 226,612 | 4/1973 | Robinson | 379/451 |
| 2,050,097 | 8/1936 | Kalenoff | 379/451 |
| 2,575,280 | 11/1951 | Long | 379/451 |
| 3,243,527 | 3/1966 | Sternheim | 379/452 |
| 3,962,555 | 6/1976 | Efaw | 379/451 |
| 4,546,217 | 10/1985 | Frehn | 379/452 |
| 4,582,966 | 4/1986 | Sutton et al. | 379/452 |
| 4,736,418 | 4/1988 | Steadman | 379/452 |
| 4,751,731 | 6/1988 | O'Connor | 379/439 |

FOREIGN PATENT DOCUMENTS

| | | | |
|---|---|---|---|
| 431769 | 7/1926 | Fed. Rep. of Germany | 379/452 |
| 2149618 | 5/1973 | Fed. Rep. of Germany | 379/452 |
| 1024191 | 3/1953 | France | 379/452 |
| 1433107 | 2/1966 | France | 379/452 |
| 2598874 | 11/1987 | France | 379/452 |
| 31801 | 11/1911 | Sweden | 379/439 |
| 458852 | 3/1935 | United Kingdom | 379/439 |

OTHER PUBLICATIONS

WO89/04096, "Single-Use Hygienic Device For Telephone Handsets", Manzella, Gaspare, 5/1989.

Primary Examiner—Jin F. Ng
Assistant Examiner—Danita R. Byrd
Attorney, Agent, or Firm—T. M. Gernstein

[57] ABSTRACT

A cover for a telephone handset includes a monolithic, one-piece body that has speaker-covering and earpiece-covering holes defined therein, and a speaker filter element and an earpiece filter element removably mounted on the body in covering relationship with each of the holes. The filter elements are removed and replaced after each use of the cover so that germs on one handset will not be transmitted to the speaker or earpiece of another handset by the cover.

2 Claims, 2 Drawing Sheets

COVER FOR A TELEPHONE HANDSET

TECHNICAL FIELD OF THE INVENTION

The present invention relates to the general art of telephony, and to the particular field of telephone handset covers.

BACKGROUND OF THE INVENTION

In today's world, many people are justifiably worried about contracting some sort of communicable disease. Many of these people are in professions that cause them to come into contact with many strangers, and the fear of the unknown may create great anxiety.

This fear of contacting a communicable disease also manifests itself in rules requiring food service personnel to wear gloves and hats when handling food, in rules requiring special packaging for food and other such items, and the like.

This fear is, of course, most apparent in association with public facilities. One such public facility that has received such attention is a public telephone. Since a telephone is used in close association with a user's face and mouth, this worry can be quite genuine in its basis, and can cause apprehension for some workers who are required to use public telephones as part of their job. Telephone repairmen are an example of such workers, especially if these repairmen are assigned to a job of maintaining public telephones.

For this reason, the art has included several proposals for covering a telephone handset or parts thereof to prevent direct contact between such handset and a user. However, while somewhat successful, these known coverings have several drawbacks which limit the effectiveness thereof.

For example, many of these devices do not cover and encase the entire handset, and thus leave exposed areas which can contain germs that can be transmitted to a user. Other ones of these covers are intended for re-use thereby vitiating the advantages thereof by exposing the cover to the possibility of carrying germs from one place to another and thus may expose a user to germs contacted in a prior use of the cover. The reusable covers also create a problem for others by, possibly, carrying germs from one handset to another. This may expose a later user of a second handset to germs that have been carried to that handset from another handset by the cover.

Accordingly, there is a need for a telephone handset cover which can totally encase a telephone handset in a manner that does not create a problem with exposing some areas of the handset to the user and which can be re-used without unduly exposing the user, or subsequent users, to germs that may have been contacted by the cover during a prior use thereof.

Objects of the Invention

It is the main object of the present invention is to provide a telephone handset cover Which can totally encase a telephone handset in a manner that does not create a problem with exposing some areas of the handset to the user.

It is another object of the present invention is to provide a telephone handset cover which can totally encase a telephone handset in a manner that does not create a problem with exposing some areas of the handset to the user and which can be re-used without unduly exposing the user to germs that may have been contacted by the cover during a prior use thereof.

It is another object of the present invention is to provide a telephone handset cover which can totally encase a telephone handset in a manner that does not create a problem with exposing some areas of the handset to the user and which can be re-used without unduly exposing the user, or subsequent users, to germs that may have been contacted by the cover during a prior use thereof.

SUMMARY OF THE INVENTION

These and other, objects are achieved by a cover for a telephone handset that has a monolithic, one-piece body and filter elements that are removably mounted thereon to cover the handset receiver and speaker. The cover also includes drawstrings to ensure that it is tightly encasing the handset and straps to further ensure such encasement of the handset. The filters are discarded after use, and a new filter is used in place of the discarded filter.

In this manner, the handset is totally encased, and the exact areas which are the main source of germs being transmitted to a user are covered with items that are discarded after each use. Thus, there is little danger of germs from one handset being transmitted to another handset by the cover used to protect against those germs.

BRIEF DESCRIPTION OF THE DRAWING FIGURES

DETAILED DESCRIPTION OF THE PREFERRED EMBODIMENT OF THE INVENTION

Figure 1:
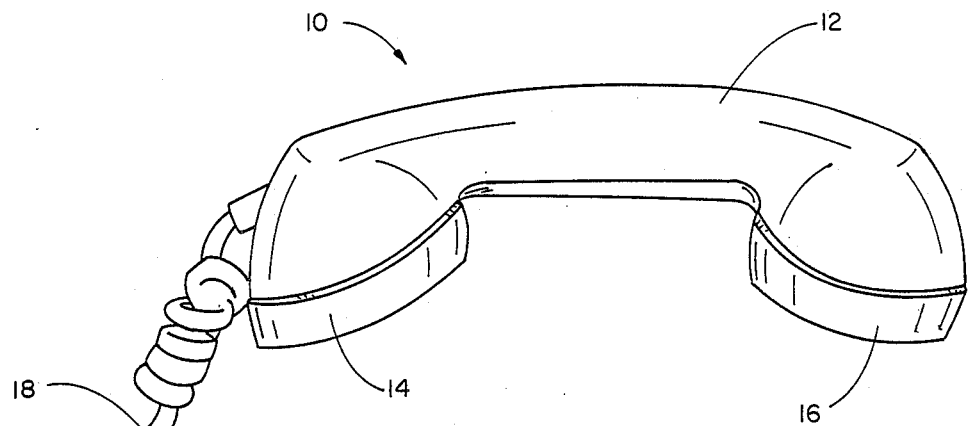
FIG. 1 is a perspective view of a telephone handset.

Shown in FIG. 1 is a typical handset 10 that is intended for use on a telephone. The handset 10 is generally plastic, and includes a body 12 that has a speaker 14 and an earpiece 16. The handset is connected to a telephone base (not shown) by a handset cord 18 for operation in a manner well known to those skilled in the telephony art.

A cover 20 is provided to prevent germs from being transmitted from the handset 10 to a user, and to prevent such germs from being spread. The cover includes a body 21 that is monolithic and one-piece to totally encase the handset so that there are no areas of the handset exposed through the cover.

The cover 20 includes a speaker end 22 and an earpiece end 24 connected by the plastics-type body 21. The speaker end has a passage 28 defined therethrough for accommodating the handset cord 18. This passage has elastic 30 surrounding it so that as soon as the cover is in place encasing the telephone handset, the elastic will close the passage 28. The passage is shown in the open configuration in FIG. 2 so that the elastic can be identified. As will be discussed below, the cover includes further elements for further ensuring a tight fit of the cover onto the handset.

The cover also includes first and second straps 34 and 36 located respectively superadjacent to the speaker end 22 and subadjacent to the earpiece end 24. A drawstring having drawstring ends 38 and 40 encircles the passage 28, and is used to further ensure the complete closing of such passage. This passage is also used to receive the handset as it is placed in the cover, and thus is expandable as necessary. However, upon pulling the drawstring closed, the cover, including the passage, will be completely closed about the handset.

The straps 34 and 36 are connected to the cover and each includes a hook-and-loop closure means, such as means 44 shown on the strap 34. This hook-and-loop fastener means will permit the straps to be closed as tightly as required to ensure a secure fit of the cover on the handset.

Figure 2:
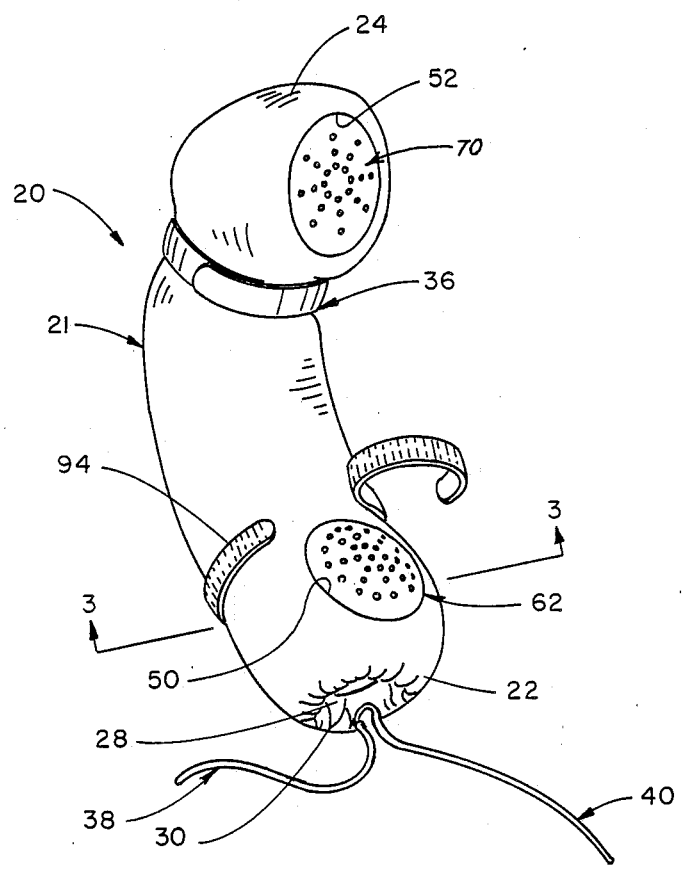
FIG. 2 is a perspective view of a telephone handset encased in a cover embodying the present invention.
Figure 3:
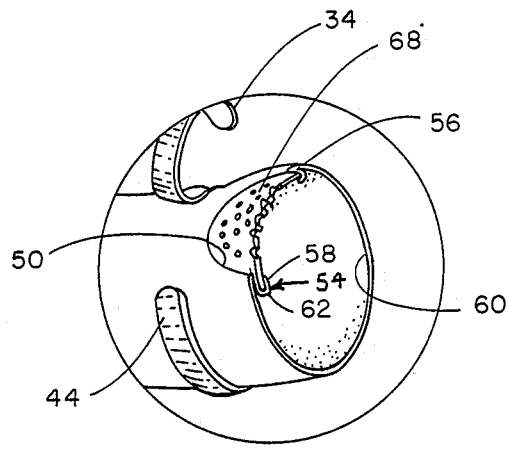
FIG. 3 is a cutaway perspective view of a portion of a removable filter element used to prevent the cover of the present invention from spreading germs from one handset to another.

As is best shown in FIGS. 2 and 3, the cover also includes a circular speaker-covering hole 50 located to cover the speaker of the telephone handset, and a circular receiver-covering hole 52 located to cover the receiver of the handset. These holes are sized to correspond to the size of the handset speaker and receiver respectively, and have a U-shaped flange, such as flange 54, on the cover to be circumjacent thereto. The flanges are part of the cover, and include a first leg 56 formed by that cover, a second leg 58 spaced from the cover inner surface 60 and connected to the first leg by a bight section 62. The flanges are oriented to open radially inward of the associated hole as shown in FIG. 3. The flanges are preferably formed of the same plastics-type material as is the cover, and thus will flex with the cover.

A speaker filter element 68 is releasably mounted in the flange surrounding the speaker-covering hole 50. The filter element 68 is used and is then removed and discarded, and a new filter element placed in the flange.

An earpiece filter element 70 is also releasably mounted in the flange surrounding the earpiece-covering hole 52, and is also removed and replaced after use. The flexible nature of the cover and the filter elements make such removal and replacement possible and expeditious.

Figure 4:
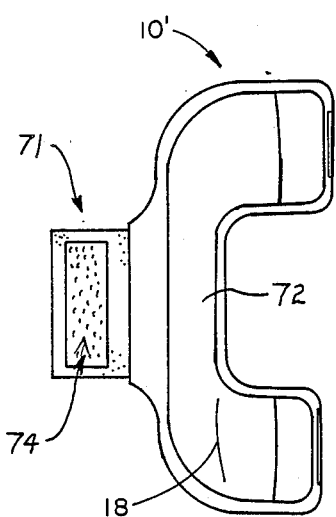
FIG. 4 is a side elevational view of a second embodiment of the present invention.
Figure 5:
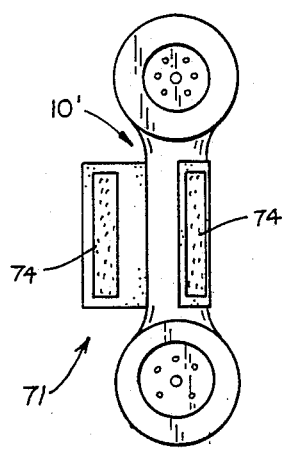
FIG. 5 is a front elevational view of the second embodiment of the present invention.

An alternative form of the cover is shown in FIGS. 4 and 5 as including a cover 10' having a body that is split along its longitudinal axis and has a flap 71 that overlaps a side 72 opposite thereto to close the cover 10'. The cover 10' also includes hook-and-loop fastening means 74 on the flap and on the cover side 72 whereby the cover 10' can be securely closed with the flap overlapping the side to completely encase the telephone handset. The cover 10' also includes removable filter elements that were discussed above. However, since the flap 71 and side 72 can define a large opening that will be completely closed, the cover 10' does not need a passage for the handset cord, and that cord is simply drawn through the opening defined between the flap and opposite side before that flap is closed. The filter elements of the cover 10' operate in the same manner as the filter elements of the cover 10.

It is understood that while certain forms of the present invention have been illustrated and described herein, it is not to be limited to the specific forms or arrangements of parts described and shown.

I claim:
1. A cover for a telephone handset comprising:
 (A) a monolithic, one-piece flexible body which completely encases a telephone handset, said body including
  (1) a speaker end,
  (2) an earpiece end,
  (3) a handset cord passage located on said speaker end through which a handset cord passes,
  (4) an elastic element mounted on said cover in surrounding relation to said handset cord passage,
  (5) a speaker filter mounting assembly which includes
   (a) a circular speaker-covering hole defined through said body to cover a speaker of the telephone handset,
   (b) a speaker-covering hole U-shaped flange having one leg formed by said body adjacent to said speaker-covering hole, a bight section on said one leg and a second leg on said bight section and extending parallel to said one leg, with both legs extending radially inwardly of said speaker-covering hole so that said U-shaped flange opens radially inwardly of said speaker-covering hole, and
  (6) an earpiece filer mounting assembly which includes
   (a) a circular earpiece-covering hole defined through said body to cover an earpiece of the telephone handset,
   (b) an earpiece-covering hole U-shaped flange having a first leg formed by said body adjacent to said earpiece-covering hole, a connecting section on said first leg and an inner leg on said connecting section and extending parallel to said first leg, with both legs extending radially inwardly of said earpiece-covering hole so that said U-shaped flange opens radially inwardly of said earpiece-covering hole;
 (B) a filter assembly which includes
  (1) a speaker-hole covering filter element removably mounted in said speaker-hole covering U-shaped flange to close and cover said speaker hole, and
  (2) an earpiece-hole covering filter element removably mounted in said earpiece-covering hole U-shaped flange to close and cover said earpiece hole; and
 (C) a cover closure assembly which includes
  (1) a drawstring mounted on said cover speaker end in surrounding relationship with said handset cord passage,
  (2) a speaker end strap mounted on said cover near said speaker-covering hole and having hook-and-loop fastener means thereon, and
  (3) an earpiece end strap mounted on said cover near said earpiece-covering hole and having hook-and-loop fastener means thereon.
2. The cover defined in claim 1 wherein said flexible body includes a plastics-type material.

* * * * *